Figure 4:
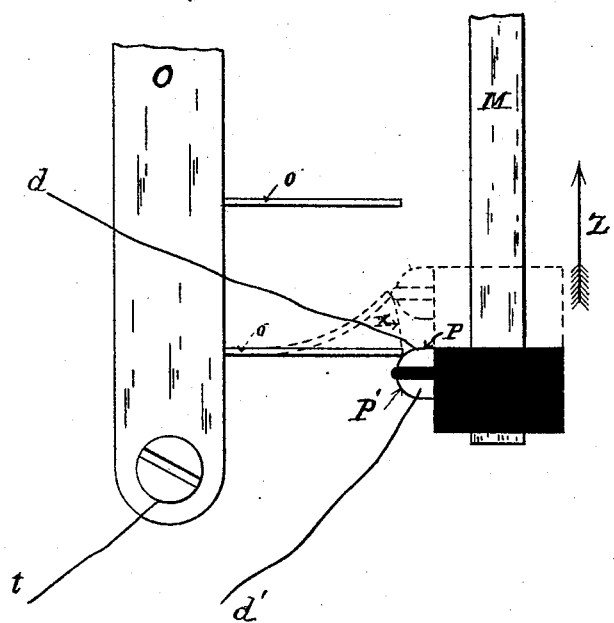

(No Model.) 3 Sheets—Sheet 1.
F. L. JOHNSTON & W. C. FLETCHER.
SPEED INDICATOR.
No. 487,275. Patented Dec. 6, 1892.
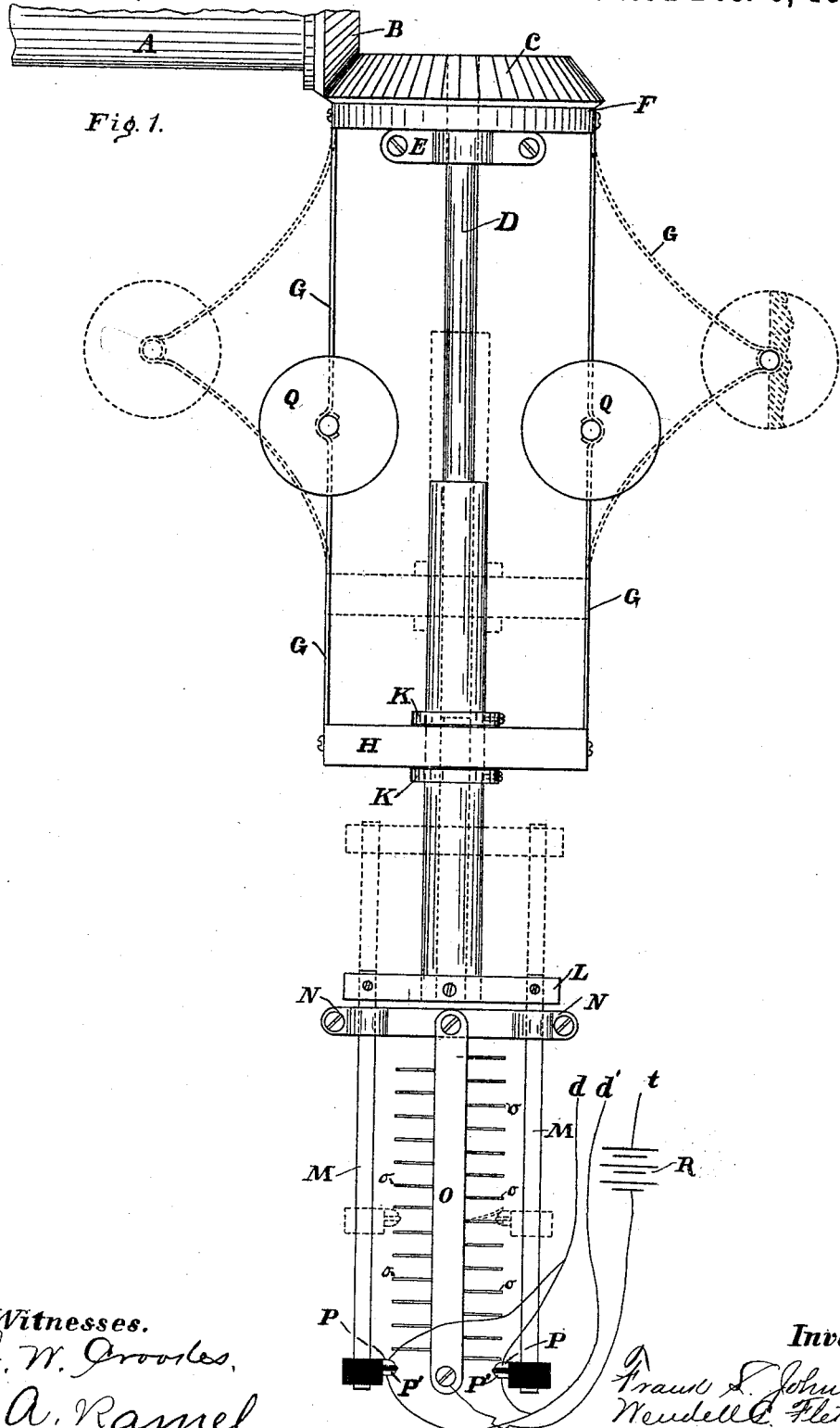

(No Model.) 3 Sheets—Sheet 2.
F. L. JOHNSTON & W. C. FLETCHER.
SPEED INDICATOR.
No. 487,275. Patented Dec. 6, 1892.
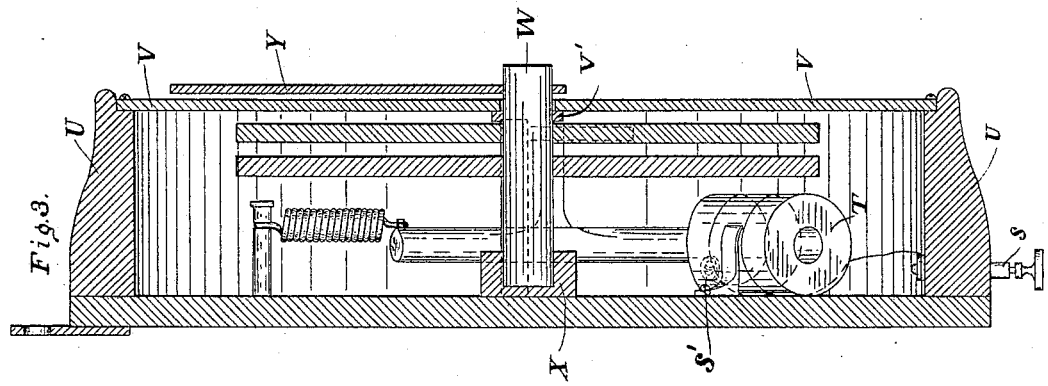
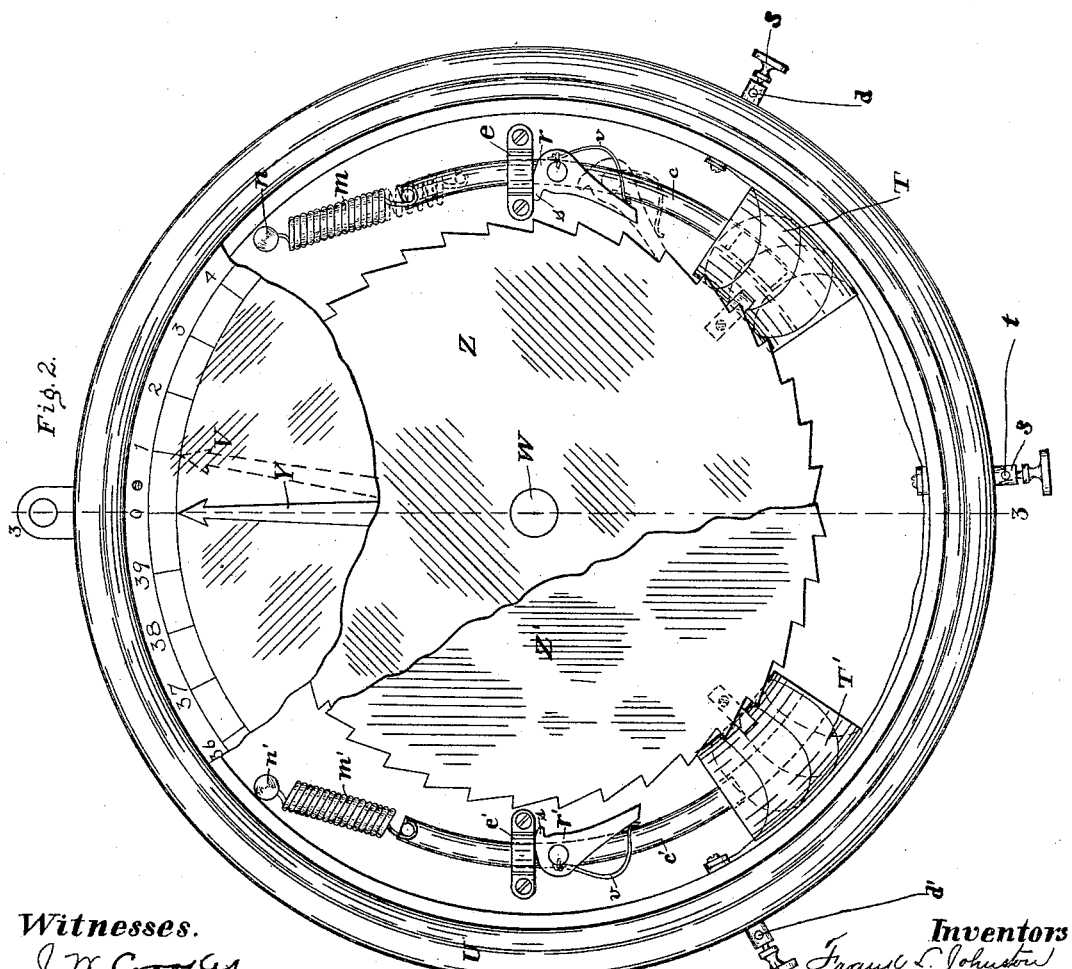

(No Model.) 3 Sheets—Sheet 3.

F. L. JOHNSTON & W. C. FLETCHER.
SPEED INDICATOR.

No. 487,275. Patented Dec. 6, 1892.

UNITED STATES PATENT OFFICE.

FRANK. L. JOHNSTON AND WENDELL C. FLETCHER, OF ST. LOUIS, MISSOURI.

SPEED-INDICATOR.

SPECIFICATION forming part of Letters Patent No. 487,275, dated December 6, 1892.

Application filed October 20, 1891. Serial No. 409,331. (No model.)

*To all whom it may concern:*

Be it known that we, FRANK. L. JOHNSTON and WENDELL C. FLETCHER, citizens of the United States, residing in the city of St. Louis and State of Missouri, have invented certain new and useful Improvements in Speed-Gages, of which the following is a full, clear, and exact description.

Our invention relates to devices for the determination at sight of the rate of speed or number of revolutions per unit of time of the shafting, &c., and has for its object the constant visual indication of the varying rates of speed at which a shaft is revolving at a distance from the same.

It consists, essentially, in effecting such indication electrically; in the features of construction hereinafter described; in a ball-governor speed-indicator, adapting it to successively close and open electric circuits to an electrically-operated dial-indicator, and in novel features of construction, hereinafter described, in the said dial, adapting it to indicate the varying rates of speed at which the shaft is rotating.

In the accompanying drawings, in which like letters of reference denote like parts in the several views, Figure 1 is a plan view of the ball-governor speed-indicator mechanically connected to the shaft for manipulating the electric circuit. Fig. 2 is a plan view of our electrically-operated indicator-dial with portions of the front parts removed. Fig. 3 is a diametrical cross-section of the same, taken as on the line 3 3 in Fig. 2; and Fig. 4 is an enlarged plan view, as in Fig. 1, of a portion of the electrical contact-making device, illustrating the method of operation of the same.

As illustrated in Fig. 1, the speed-indicator consists in a spring ball-governor driven by the shaft the speed of which it is desired to note, the centrifugal movement of which, as actuated by the increased speed of the shaft, gives to an electric contact-making device a longitudinal movement adapting it to successively close an electric circuit to the operative magnets of indicator-dial illustrated in Figs. 2 and 3.

A represents the end of the shaft the speed of which it is desired to determine, to the end of which is rigidly secured the bevel-gear B, which is in engagement with a bevel-gear C, rigidly secured on the shaft D of the ball-governor. We have preferably shown this mechanical means of connecting the shaft A to the governor. The same results might be effected by a belt-and-pulley arrangement. The shaft D gets a bearing at E, which also prevents any longitudinal movement of the shaft D and that end of the governor by abutting against the flat side of a disk F, secured on the shaft D under the bevel-gear wheel C. To diametrically-opposite sides of the disk F are secured the ends of the flat-jointed governor-springs G. The other ends of the springs G are rigidly secured to diametrically-opposite sides of the disk plate H, which is revolubly fitted on the tubular rod I and retained longitudinally by the two collars K. Into one end of this tube I is revolubly fitted the governor-shaft D. The other end of the tube is rigidly secured to the contact-making framing, which consists of the cross-piece L and the longitudinally-extending arms M. The arms M get sliding bearings at N in a casting secured to the general supporting-framework of the device. (Not shown.) Situated between the extending arms M is secured the framework of contact-springs, which consists of a supporting-block O, to which are secured the oppositely-projecting flat springs o. The springs o are staggered longitudinally on the opposite sides of the supporting-block O, in order to provide double the number of points of contact in the length of the same for a given distance apart of the springs o. To the ends of the arms M, electrically insulated therefrom and from each other, are secured the contact-making pieces P and P', which in the operation of the device, as hereinafter described, are adapted to make contact with the several springs o.

As before stated, the governor-springs G are preferably jointed midway in their length and formed into a hinge-joint, to the hinge-bolt of which are secured the governor-weights Q, which are slotted out for approximately one-half their width to accommodate the springs G.

To the centrally-placed supporting-block O, to which the springs o are secured, is secured one terminal of a battery or other source of electricity R, the other terminal t of which is secured to the binding-post or other means of securing the same S, (see Fig. 2,) which is the common terminal of the two magnets T and T', which operate the dial-indicator. The contact-making plates P and P' are electrically connected by the conductors $d$ and $d'$, respectively, to the binding-posts S' and S'', (see Fig. 2,) which are respectively the second terminals of the operating-magnets T and T'.

The indicator-dial consists of the casing U, the front side of which is closed by the dial V. A central perforation in the dial V acts as the bearing for one end of the pivot stud or pin W. The other end of the pivot-pin W gets a bearing in a block X, secured to the inside of the back of the casing U. To the end of the pivot-pin W, which extends beyond the dial V, is rigidly secured the index-hand Y. On the pivot-pin W, immediately beneath the dial V, is secured the collar V', which prevents any longitudinal movement of the pivot-pin. To the pivot-pin W, at convenient positions in the length of the same on the inside of the inclosing dial-plate V, are rigidly secured the ratchet-wheels Z and Z', with the abrupt engagement-shoulder of their ratchet-teeth turned in the opposite directions.

As illustrated in Figs. 2 and 3, the operative electric magnets T and T' are solenoids, into the hollow of which, in the operation of the indicator, the bent core-pieces $c$ and $c'$ are adapted to project. The core-pieces $c$ and $c'$ get sliding bearings at $e$ and $e'$, secured to the framing of the casing, and to their ends are secured the coil-springs $m$ and $m'$, which, having their other ends secured to the standards $n$ and $n'$, secured to the casing U, tend to withdraw the core-pieces of the solenoids T and T'. To the core-pieces $c$ and $c'$ are secured the spring-governed pawls $r$ and $r'$, which are respectively adapted to engage with the ratchet-wheels Z and Z'. The pawls $r$ and $r'$ are formed with a laterally-projecting shoulder $s$, which when the core-pieces are pulled back by the springs $m$ and $m'$ will abut against the bearings $e$ and $e'$ and throw the ends of the pawls out in a position of non-engagement with the ratchet-wheels Z and Z'.

As illustrated and described, our gage is a step-by-step indicator of a degree of fineness as indicating the varying speeds of the shaft A, dependent on the number of contacts made for a given length of longitudinal movement of the contact-making device as actuated by the ball-governor. This, of course, can be varied at pleasure and will be determined by the requirements in any particular case.

While we have shown our operative magnets of our dial-indicator as solenoids with a movable core, yet it may be found of advantage to make use of a direct-acting electro-magnet with an armature, and we do not desire to be understood as limiting ourselves to the herein-described particular form of magnet.

The principles of operation of our speed-gage, as described, is as follows: With the increased speed of the shaft A the weights Q will by the centrifugal action of rotation be thrown out radially toward the position shown in dotted lines in Fig. 1, and as the end of the piece F is prevented from any longitudinal movement by the journal-block E the end piece H will be forced to approach the end piece F, carrying with it the tube I and attached contact-making frame. In the forward longitudinal movement of the arms M the contact-plates P will be brought successively in contact with the springs $o$, thus closing and opening, for each spring $o$ made contact with, the electric current from the battery R through the forwardly-operating magnet T, Fig. 2. The current being closed through the magnet T, the core-piece $c$ will be drawn into the same against the retaining-tension of the spring $m$ directly the core-piece $o$ is drawn toward the magnet T, and the pawl attached thereto leaves its bearing against the block $e$, the pawl-spring $v$ will throw the pawl $r$ into engagement with the teeth on the ratchet-wheel Z, moving the same, and with it the index-hand Y, a step forward (to the position shown in dotted lines in Fig. 2) one step for each individual contact with the springs $o$. Of course the figures on the dial V are arranged in position and numerically so as to indicate for any position of the index-hand Y the number of rotations for the selected unit of time at which the shaft A is turning. The retaining-spring $m$ will withdraw the core-piece $c$ to its normal position—that shown in full lines in Fig. 2—ready to be acted on by the magnet, when the circuit is again closed. The comparative strength of the retaining-spring $m$ and the pawl-spring $v$ is such that the spring $m$ will withdraw the core-piece $c$ and throw the pawl $r$ out of engagement with the ratchet-wheel Z by the shoulder $s$, abutting against the bearing-block $e$ against the engaging tendency of the spring $v$. When the speed of the shaft A is decreased, the weights Q will recede toward the center, giving the contact-making device a backward longitudinal movement, which will bring the contact-plates P' successively into contact with the springs $o$, thus closing the circuit through the backwardly-operating magnet T', which in turn will operate the ratchet-wheel Z' through the pawl $r'$, causing the index-hand Y to point to a correspondingly-smaller number on the dial V. The operation of this retrograde movement of the index-hand is similar to that described in the forward movement as actuated by the magnet T.

The contact-plates P and P' are so placed relative to the springs $o$ and the form of the protruding insulation between them is such that contact is made by either of them only when moving in their respective directions, the contact-plate P making contact with the springs $o$ only on the forward movement of the arms M and slipping by without allowing the contact-plate P' to come in contact with the springs o, and vice versa, for the retrograde or decreasing speed movement. How this result is effected is shown in Fig. 4, in which the dotted-line position of the insulation-block, to which the contact-plates P and P' are secured, sliding on the guide-bar M, shows a removed position thereof, from the full-line position, in the direction of the arrow Z. The dotted-line position shows the position of the sliding insulation-block in the forward longitudinal movement of the same, where the spring o is just being released from the bent-tension position to which it has been carried by the sliding block, or rather the contact-plate P from the tip end of the intermediate insulation between the contact-plates P and P'. The least movement forward will allow it (the spring o) to fly back to its normal position, its end describing the arc x, as shown, without coming in contact with the contact-plate P'. The length of the springs o is such, or, what is the equivalent, the relative distance between bar M and the bar O, to which the springs o are secured, and the length of the projecting portion of the insulation-tip is such, that when the springs o are released from off the end of the insulation-tip by the movement of the same it (the spring o) will not come in contact with the contact-plate P' when the sliding frame is moving in this direction. When the longitudinal movement of the sliding frame is reversed, the contact-plate P' touches the springs o and the plate P does not.

We claim—

1. In a speed-indicator, a ball-governor, in combination with a frame adapted to be given a longitudinal movement relative to the axis of rotation of the ball-governor by the centrifugal movement of the weights on said governor, the said frame carrying electrical contact-making plates adapted in the movement of said frame to successively close and open an electric circuit, substantially as described, and for the purposes specified.

2. In a speed-indicator, a ball-governor, in combination with a frame adapted to be given a longitudinal movement relative to the axis of rotation of said governor by the centrifugal movement of the weights of the said governor, the said frame carrying two electrical contact-making plates or sets of plates adapted in the movement of said frame to successively close and open electrical circuits in the forward and backward movement, respectively, of said frame, substantially as described, and for the purposes specified.

3. In a speed-gage, in combination with the herein-described dial-indicator, consisting in a casing, a dial numbered corresponding to the different rates of speed, an index-hand rigidly secured to a pivot-shaft, ratchet-wheels rigidly secured to said pivot-shaft, said ratchet-wheels having their ratchet-teeth turned in opposite directions, respectively, pawls adapted to engage with said wheels and electro-magnets adapted to operate said pawls, and a longitudinally-movable frame carrying contact-making plates adapted to close an electric circuit to said electro-magnets in the forward and backward movement of said frame, respectively, combined and operating substantially as described, and for the purposes specified.

4. In a dial-indicator of the character described, a ratchet wheel or wheels formed with oppositely-extending ratchet-teeth adapted to operate the index-hand of said dial, pawls adapted to engage with and operate said ratchet wheel or wheels, said pawls being formed with laterally-projecting shoulders adapted to normally retain the said pawls in a position of non-engagement with said ratchet wheel or wheels, and means for operating said pawls, combined and operating substantially as described, and for the purposes specified.

5. In a speed-gage, a ball-governor, a contact-making device adapted to be given a longitudinal movement by the rotation of said governor, said contact-making device being adapted to successively close and open an electric circuit, a dial-indicator consisting in a dial and index-hand, a ratchet wheel or wheels to operate said index-hand, said ratchet wheel or wheels having ratchet-teeth extending in opposite directions, pawls adapted to engage with and operate said ratchet wheel or wheels, said pawls being normally in a position of non-engagement with said ratchet-teeth, electro-magnets adapted to operate said pawls, electric circuits connecting said contact-making device with said magnets, and an electric battery interposed in said circuit, the whole combined and operating substantially as described, and for the purposes described.

In testimony whereof we have affixed our signatures, in presence of two witnesses, this 2d day of October, A. D. 1891.

FRANK. L. JOHNSTON.
WENDELL C. FLETCHER.

Witnesses:
J. W. CROOKES,
A. RAMEL.